United States Patent [19]
Nadgauda et al.

[11] Patent Number: 6,011,800
[45] Date of Patent: Jan. 4, 2000

[54] HIERARCHICAL RESOURCE MANAGEMENT METHOD, SYSTEM, BASE STATION, HEAD-END UNIT AND SUBSCRIBER UNIT FOR VARIABLE RESOURCE SIZE COMMUNICATION SYSTEMS

[75] Inventors: Nikhil Shashank Nadgauda, Chicago; Kevin Lynn Baum, Rolling Meadows; Brian Keith Classon, Mt. Prospect, all of Ill.

[73] Assignee: Motorola, Inc., Schaumburg, Ill.

[21] Appl. No.: 08/824,497

[22] Filed: Mar. 26, 1997

[51] Int. Cl.⁷ .................................................. H04J 1/08
[52] U.S. Cl. ..................... 370/437; 370/468; 370/487
[58] Field of Search .................................. 370/319, 468, 370/487, 539, 437, 541; 375/202, 203, 267, 299, 347

[56] References Cited

U.S. PATENT DOCUMENTS

| | | | |
|---|---|---|---|
| 4,763,322 | 8/1988 | Eizenhofer | 370/95 |
| 4,870,642 | 9/1989 | Nohara et al. | 370/75 |
| 5,305,314 | 4/1994 | Edblad et al. | 370/79 |
| 5,583,851 | 12/1996 | Kato et al. | 370/342 |
| 5,818,829 | 10/1998 | Raith et al. | 370/347 |

OTHER PUBLICATIONS

Andy D. Kucar, "Mobile Radio: An Overview", IEEE Communications Magazine, pp. 72–85, Nov. 1991.

Masato Hayashi, "A Study on Satellite Channel Assignment Method having Control of Call Loss Probability for Carriers with Different Transmission Bandwidths under FDMA Operation", IEEE, pp. 1006–1010, May 1996.

Primary Examiner—Melvin Marcelo
Attorney, Agent, or Firm—Darleen J. Stockley

[57] ABSTRACT

A method (300), system (400), base station (500), head-end unit (600), and subscriber unit (700) provide for efficient resource management in a communication system or group of communication systems supporting a plurality of communication units, where different communication units may have varying resource size requirements. The method includes the steps of: determining a resource size requirement of a communication unit of the plurality of communication units, determining a hierarchical level within the hierarchy that the communication unit is to be assigned to based on the resource size requirement of the communication unit, and assigning the communication unit to an available resource slot in the hierarchical level in accordance with a predetermined hierarchical management scheme that maximizes a total number of remaining available slots in the hierarchy.

72 Claims, 8 Drawing Sheets

HIERARCHICAL RESOURCE MANAGEMENT METHOD, SYSTEM, BASE STATION, HEAD-END UNIT AND SUBSCRIBER UNIT FOR VARIABLE RESOURCE SIZE COMMUNICATION SYSTEMS

RELATED APPLICATION

The present application is related to Hierarchical Resource Hopping Method, System, Base Station, Head-End Unit, And Subscriber Unit For Variable Resource Size Communication Systems having Ser. No. 08/824,880, by Nikhil Shashank Nadgauda, Brian Keith Classon, and Kevin Lynn Baum, assigned to Motorola, Inc., and filed concurrently on Mar. 25, 1997.

FIELD OF THE INVENTION

The present invention relates generally to resource management for communication systems, and in particular, to resource management for communication systems which support multiple resource sizes.

BACKGROUND OF THE INVENTION

The allocation and management of shared resources is an integral component of wireless communication systems. It is straightforward to implement a resource management method for a communication system which supports a plurality of communication units with uniform resource size requirements. Uniform resource size requirements imply that each communication unit operates with the same bandwidth, time-slot length, or more generally the same amount of any of the radio signal resources known in the art.

In the case where the resource being managed is the frequency of a signal, the available spectrum is divided into equal-width frequency slots, with the width of each slot being equal to the communication unit signal bandwidth. The resource management method then consists of assigning each communication unit, as it requests access to the communication system, to one of these available frequency slots. The communication unit is then able to transmit or receive within the assigned frequency slot. If no frequency slots are available, the resource management method dictates that the communication unit is not assigned to any frequency slot and is therefore unable to transmit or receive. Likewise, in the case where the resource being managed is the transmission and/or reception time duration of a signal, a time frame may be divided into equal-width time slots, with the width of each slot being equal to the communication unit transmission and/or reception time duration. The resource management method then consists of assigning each communication unit, as it requests access to the communication system, to one of these available time slots. The communication unit is then able to transmit or receive within the assigned time slot. If no time slots are available, the resource management method dictates that the communication unit is not assigned to any time slot and is therefore unable to transmit or receive.

Allocating and managing resources in a communication system that uses uniform bandwidth frequency slots is well known in the art. FIG. 1, numeral 100, shows a signal bandwidth divided into uniform width frequency slots as is known in the art. In this illustrative example, the resource in question is frequency. The signal bandwidth shows four frequency slots (110, 120, 130, 140), three of which (110, 120, 140) are occupied by signals (152, 162, 172) originating from a plurality of communication units (150, 160, 170, respectively). In this scenario, the resource allocation and management strategy is very straightforward. If a new communication unit (180) wants to access the system, the resource manager merely needs to check if there are any available frequency slots and if so, assign the new communication unit (180) to one of these slots. In the present example, frequency slot (130) is unoccupied. Therefore, communication unit (180) can be assigned to frequency slot (130) and begin transmitting or receiving its signal (182) in that portion of the frequency spectrum. Similarly, allocating and managing resources in a communication system that uses uniformly sized time slots is also well known in the art.

However, these prior art resource allocation and management methods are not applicable to a communication system or group of communication systems which support multiple resource sizes. Therefore, a need exists for a method, system, base station, head-end unit, and subscriber unit that provide for efficient resource management in a communication system or group of communication systems supporting a plurality of communication units, where different communication units may have different or varying resource size requirements.

DETAILED DESCRIPTION OF THE PREFERRED EMBODIMENTS

Figure 1:
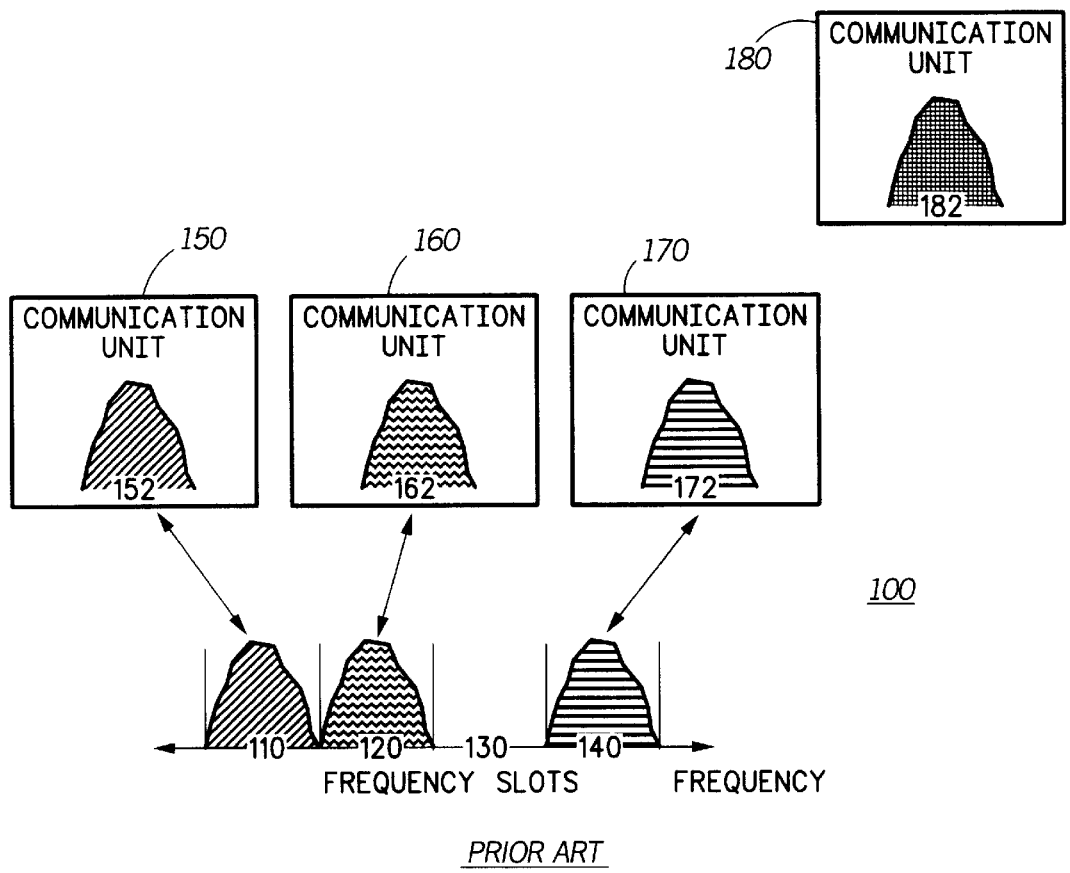
FIG. 1 is a diagrammatic representation of a system frequency region, or bandwidth, divided into uniform size frequency slots for a plurality of uniform bandwidth communication units as is known in the art.

The present invention provides a hierarchical resource management method, system, base station, head-end unit, and subscriber unit for a communication system which supports a plurality of resource sizes. It is desirable for a communication system to support a plurality of resource sizes so that the capabilities and cost of the subscriber units may be scaled in accordance with the throughput requirements of the user. For example, a voice communication unit may be inexpensive and require only a small amount of radio signal bandwidth, while a high speed data communication unit may be more expensive and require several times the bandwidth of the voice communication unit. In this example, the communication system supports two resource sizes, one resource size for each type of subscriber unit. In this example, a resource size is the signal bandwidth. Likewise, in a purely TDM/TDMA (time division multiplex/time division multiple access) based system, a voice communication unit may require the use of only one time slot per frame, whereas the high speed data communication unit may require the use of multiple time slots in each TDM/TDMA frame. In a CDMA (code division multiple access) system, the resource size is determined by the number of codes allocated to a communication unit or the spreading factor associated with a particular communication unit. Combinations of different bandwidths and different numbers of time slots or codes may also be used to support different communication units with different throughput requirements. A combination of two or more radio resources such as this will also generally be referred to as a resource.

For a communication system which supports a plurality of communication units with non-uniform resource size requirements, implementing a resource management method is not straightforward. Generally, these communication systems consist of, but are not limited to, a base station/head-end unit and one or more communication units/subscriber units having different resource size requirements due to different throughput requirements. In this scenario, the prior-art notion of a management, or equivalently an allocation, method is not applicable because the differing resource sizes necessitate not only varying numbers of resource slots, but also varying size resource slots. Prior-art management methods for multiple user communication systems generally require uniform resource sizes to attain highly efficient resource usage.

The present invention provides a method, system, base station, head-end unit, and subscriber unit that provide for efficient resource management in a communication system or group of communication systems supporting a plurality of communication units, where different communication units may have different or varying resource size requirements. The present invention facilitates efficient resource management in three ways. First, the invention imposes a hierarchical resource slot structure on the signal resource region in accordance with the various resource sizes necessitated by the plurality of communication units. Second, as a communication unit attempts to access the system, the invention determines the resource size requirement of the communication unit, matches it to an appropriate level within the hierarchical resource slot structure, and, if one is available, assigns it to a resource slot on that level which maximizes the total number of remaining available resource slots throughout the hierarchy. Finally, the invention provides a resource reorganization method which potentially reassigns communication units already accessing the system to new resource slots ensuring that the total number of remaining available resource slots is maximized. This reorganization may be necessary after one or more communication units have vacated the system.

Figure 4:
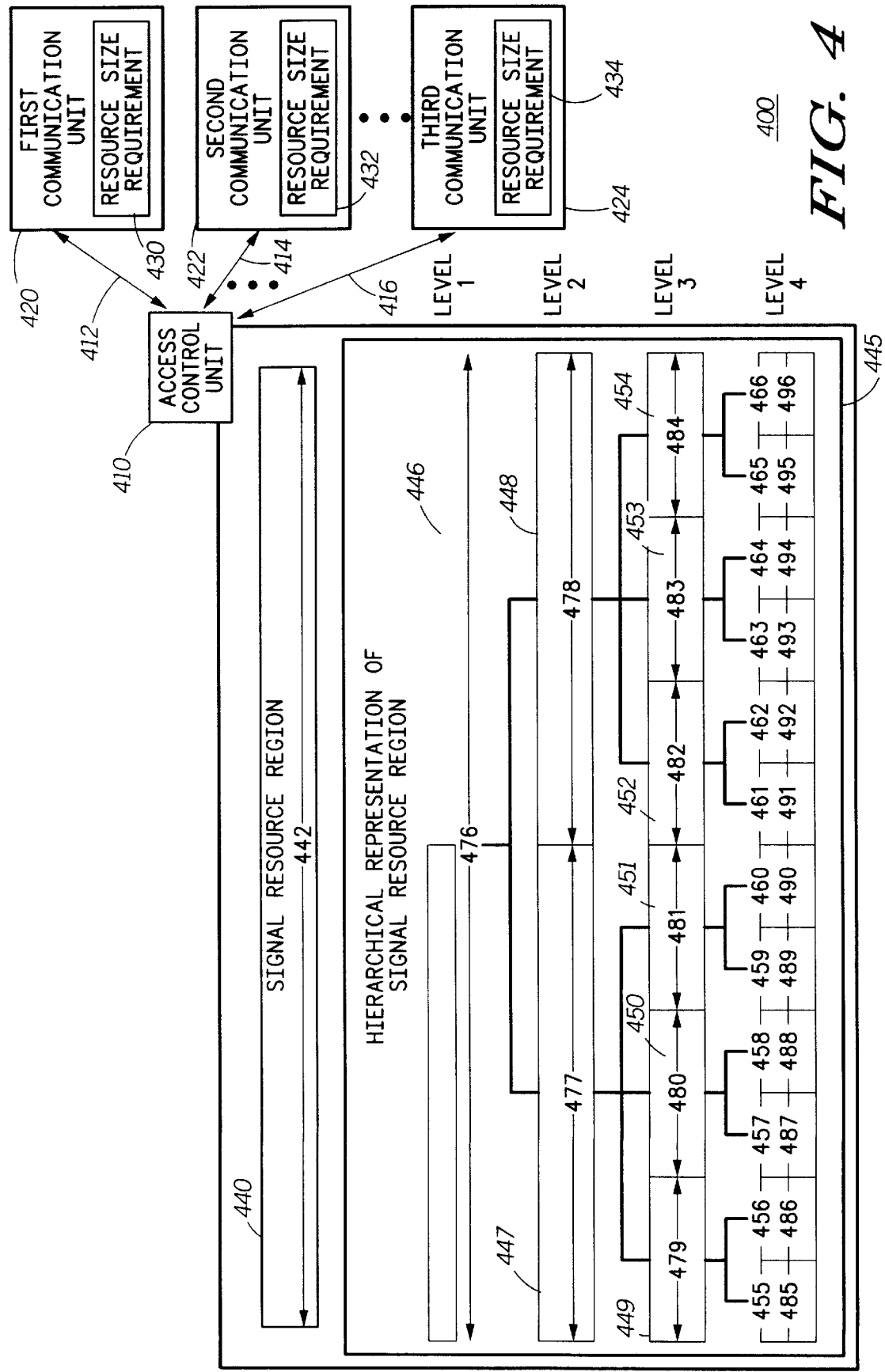
FIG. 4 is a diagrammatic representation of one embodiment of a communication system in accordance with the present invention.

The present invention can be more fully described with reference to FIGS. 4–10, numerals 400, 500, 600, 700, 800, 900, and 1000, respectively. FIG. 4 illustrates an exemplary communication system (400) in accordance with the present invention. The communication system (400) includes an access control unit (410), a plurality of communication units (420, 422, . . . , 424), each with different resource size requirements (430, 432, . . . , 434), and a plurality of coupling mechanisms (412, 414, . . . , 416). Among the primary functions of the access control unit (410) are allowing or disallowing communication units to access the communication system (i.e. come on-line), assigning communications units which are allowed to access the communication system to a resource slot in a hierarchical representation of a resource region in a manner that maximizes the total number of remaining available resource slots, and potentially reassigning communication units which are already accessing the communication system in order to maximize the total number of remaining available resource slots. This reassignment may be necessary after one or more communication units have vacated (i.e. gone off-line or disconnected from) the communication system. In a preferred embodiment, the access control unit (410) is a base station, such as a base station for a cellular radio communication system. In an alternate embodiment, the access control unit (410) is a head-end unit. In another alternate embodiment, the access control unit (410) is a subscriber unit. In a preferred embodiment each communication unit (420, 422, . . . , 424) is a subscriber unit. In a preferred embodiment, each coupling mechanism (412, 414, . . . 416) is a wireless radio link. In an alternate embodiment, coupling mechanisms (412, 414, . . . , 416) are provided by a wireline cable link. The access control unit (410) and the plurality of communication units (420, 422, . . . , 424) use a signal resource region (440) for the transmission and/or reception of signals. Note that the present invention is equally applicable to communication from the access control unit (410) to the communication units (420, 422, . . . , 424), communication from the communication units (420, 422, 424) to the access control unit (410), and communication among the plurality of communication units (420, 422, . . . , 424). The invention may be employed in either or all types of links, so hereafter no distinctions will be made between transmission and reception or the three types of links.

Resource region (440) has a corresponding resource region size (442). In a preferred embodiment, the signal resource region (440) is a predetermined frequency band. In an alternate embodiment, the signal resource region (440) is a predetermined TDM/TDMA time frame. In another alternate embodiment, the signal resource region (440) represents a predetermined set of code sequences. In yet another alternate embodiment, the signal resource region (440) is a predetermined time-frequency plane. Communication units (420, 422, . . . , 424) have potentially different resource size requirements (430, 432, . . . , 434, respectively). As discussed earlier, the resource size requirement of a communication unit is preferably directly related to the throughput requirement of the communication unit. In one embodiment, a first resource size requirement (430) is exactly three times the size of a second resource size requirement (432), and the second resource size requirement (432) is exactly two times the size of a third resource size requirement (434).

The hierarchical representation of a resource region (445) is formed by recursively dividing the signal resource region (440) into sets of smaller resource regions. The first level of hierarchy defines a resource slot (446) whose size (476) is equal to the resource region size (442). In this example, a first communication unit (420) has the largest resource size requirement (430), and the size (442, 476) of the resource region (440, 446) is exactly twice the size of the resource size requirement (430) for the first communication unit (420). The next level of hierarchy is the second level of hierarchy, which is defined by dividing the resource region (440, 446) into two smaller resource slots (447, 448) whose sizes (477, 478) are each equal to the resource size requirement (430) of the first communication unit (420), which is the largest resource size requirement. The next level of hierarchy is the third level of hierarchy, which is defined by dividing the first smaller resource slot (447) into three smaller resource slots (449, 450, 451), and by dividing the second smaller resource slot (448) into three smaller resource slots (452, 453, 454) because the resource size requirement (432) for the second communication unit (422) is one-third of the resource size requirement (430) for the first communication unit (420). The sizes (479, 480, 481, 482, 483, 484) of resource slots (449, 450, 451, 452, 453, 454) are each equal to the resource size requirement (432) of the second communication unit (422). The next level of hierarchy is the fourth and final level of hierarchy in this embodiment, which is defined by dividing each resource slot (449, 450, 451, 452, 453, 454)into two smaller resource slots, because the resource size requirement (434) for the third communication unit (424) is one-half the resource size requirement (432) of the second communication unit (422). Each smaller resource slot (449; 450; 451; 452; 453; 454) is divided to form two resource slots (455, 456; 457, 458; 459, 460; 461, 462; 463, 464; 465, 466). Each resource slot (455, 456; 457, 458; 459, 460; 461, 462; 463, 464; 465, 466) in the fourth level of hierarchy has a size (485, 486; 487, 488; 489, 490; 491, 492; 493, 494; 495, 496) which is equal to the resource size requirement (434) of the third communication unit (424).

In a preferred embodiment, the size of the resource slots on a given level will equal the resource size necessitated by a given communication unit. In an alternate embodiment, the size of the resource slots on a given level will be slightly greater than the resource size necessitated by a given communication unit. In a preferred embodiment, the number of levels in the hierarchical representation of the resource region (445) will be one greater than the number of differing resource requirements among the plurality of communication units. In a preferred embodiment, the number of resource slots on a given level within the hierarchy will be a multiple of the number of resource slots on the prior level within the hierarchy.

Generally, it is preferable for all of the resource sizes to be supported by the communication system to be specified before the communication system is deployed so that the hierarchical representation of the resource region (445) can be defined when designing and planning the communication system (400). However, in an alternate embodiment, the hierarchical representation of the resource region (445) will be defined while the communication system (400) is in operation to provide greater flexibility. In a preferred embodiment, the hierarchical representation of the resource region (445) may be modified according to a predetermined modification-replacement scheme as the resource size requirements among the plurality of communication units change. Possible changes include, but are not limited to, the addition of new levels and the deletion of existing levels. The access control unit (410) maintains the hierarchical representation of the resource region (445), assigns communication units to particular resource slots within the hierarchical representation of the resource region (445) in a manner which maximizes the total number of remaining available resource slots, and potentially reassigns communications units already accessing the communication system to different resource slots in order to maximize the total number of remaining available resource slots.

Once the hierarchical representation (445) of the resource region (440) is defined, each communication unit among the plurality of communication units can be assigned to a resource slot within the hierarchical representation (445). In a preferred embodiment this assignment takes place as the communication unit attempts to access the communication system, either to transmit or receive. In an alternate embodiment, this assignment is determined when the communication system is being designed or planned. Each communication unit is assigned to a resource slot on a hierarchical level commensurate with the resource size requirement of the communication unit.

The assignment process for a communication unit can be broken down into three steps. These three steps are repeated sequentially for each communication unit as it, in turn, attempts to access the communication system. In the first step, the access control unit (410) determines the resource requirements of the communication unit attempting to access the communication system (400). In a preferred embodiment this determination is accomplished by having the communication unit which is attempting to access the system transmit a message containing its resource size requirements via a coupling mechanism connecting the communication unit to the access control unit. In this illustrative example, when a given communication unit (420, 422, or 424) attempts to access the communication system (400), it transmits a message containing its resource size requirement (430, 432, or 434) to the access control unit (410) via a coupling mechanism (412, 414, or 416). In an alternate embodiment, the access control unit (410) is able to determine the resource size necessitated by a communication unit without the need for an explicit message sent by the communication unit. The determination can be made by measuring one or more inherent characteristics of the data signals sent by the communication unit to the access control unit (410) via a coupling mechanism. It can also be made based on information about the resource size requirements of given communication units which is stored within the access control unit (410). In this illustrative example, when a given communication unit (420, 422, or 424) attempts to access the communication system (400), the access control unit (410) is able to determine the communication unit's (420, 422, or 424) resource size requirement (430, 432, or 434) without the need for an explicit message sent by the communication unit (420, 422, or 424). In another alternate embodiment, the access control unit (410) assumes a default resource size requirement for a communication unit which will attempt to access the system. In such a scenario, the access control unit (410) transmits a paging or broadcast signal to a communication unit indicating a potential call. The communication unit, upon receiving the paging signal, attempts to access the communication system. For the purposes of transmitting the paging signal, the access control unit (410) may utilize a default resource size.

Once the access control unit (410) determines the resource size requirement of the communication unit, it then determines which level within the hierarchical representation of the resource region is suitable to which to assign the communication unit. This second step in the assignment process is accomplished by matching the resource size necessitated by the communication unit attempting to access the communication system (400) to the size of the uniform width resource slots on a given level within the hierarchical representation of the resource region. In a preferred embodiment, a communication unit is assigned to a hierarchical level such that the size of the resource slots on that level is greater than or equal to the resource size requirement of the communication unit and the size of the resource slots on the next level in the hierarchy is smaller than the resource size requirement of the communication unit. In another preferred embodiment, a communication unit is assigned to a hierarchical level such that the size of the resource slots on that level is greater than or equal to the resource size requirement of the communication unit and the size of the resource slots on that level is less than two times the resource size requirement of the communication unit. In either preferred embodiment, a new level of hierarchy is added if the smallest resource size supported by the communication system is less than half of the size of the smallest resource slot.

In this illustrative example, the first communication unit (420) is assigned to the second level of the hierarchy because the size of the resource slots on the second level (447, 448) matches the resource size requirement (430) of the first communication unit (420). The second communication unit (422) is assigned to the third level of hierarchy because the size of the resource slots on third level (449, 450, 451, 452, 453, 454) matches the resource size requirement (432) of the second communication unit (422). Similarly, the third communication unit (424) is assigned to the fourth level of hierarchy because the size of the resource slots on the fourth level (455, 456, 457, 458, 459, 460, 461, 461, 462, 463, 464, 465, 466) matches the resource size requirement (434) of the third communication unit (424).

The third step of the assignment process calls for the assignment of the communication unit attempting to access the communication system to a particular resource slot on the hierarchical level to which it has been assigned. In the illustrative example, the first communication unit (420) is assigned to one of the resource slots on the second level of the hierarchy (447 or 448). The second communication unit (422) is assigned to one of the resource slots on the third level of the hierarchy (449, 450, 451, 452, 453, or 454), and the third communication unit (424) is assigned to one of the resource slots on the fourth level of the hierarchy (455, 456, 457, 458, 459, 460, 461, 461, 462, 463, 464, 465, or 466). However, when such an assignment is made, a primary ambiguity arises if more than one resource slot on the appropriate level is available. In this illustrative example, there arises a question of where to assign the second communication unit (422) if several slots on the third level of the hierarchy are available (e.g. 449, 450, 452, and 454). The present invention solves this primary ambiguity by assigning the communication unit in a manner which maximizes the total number of remaining available slots in the hierarchy. This maximization is an important part of the assignment strategy as it prevents communication units with smaller resource size requirements which are assigned to higher levels, from needlessly blocking the assignment of future communication units with larger resource requirements which are to be assigned to lower levels. Such maximization keeps the system from wasting excess capacity and denying service to communication units when there are sufficient available resources to support them.

Figure 2:
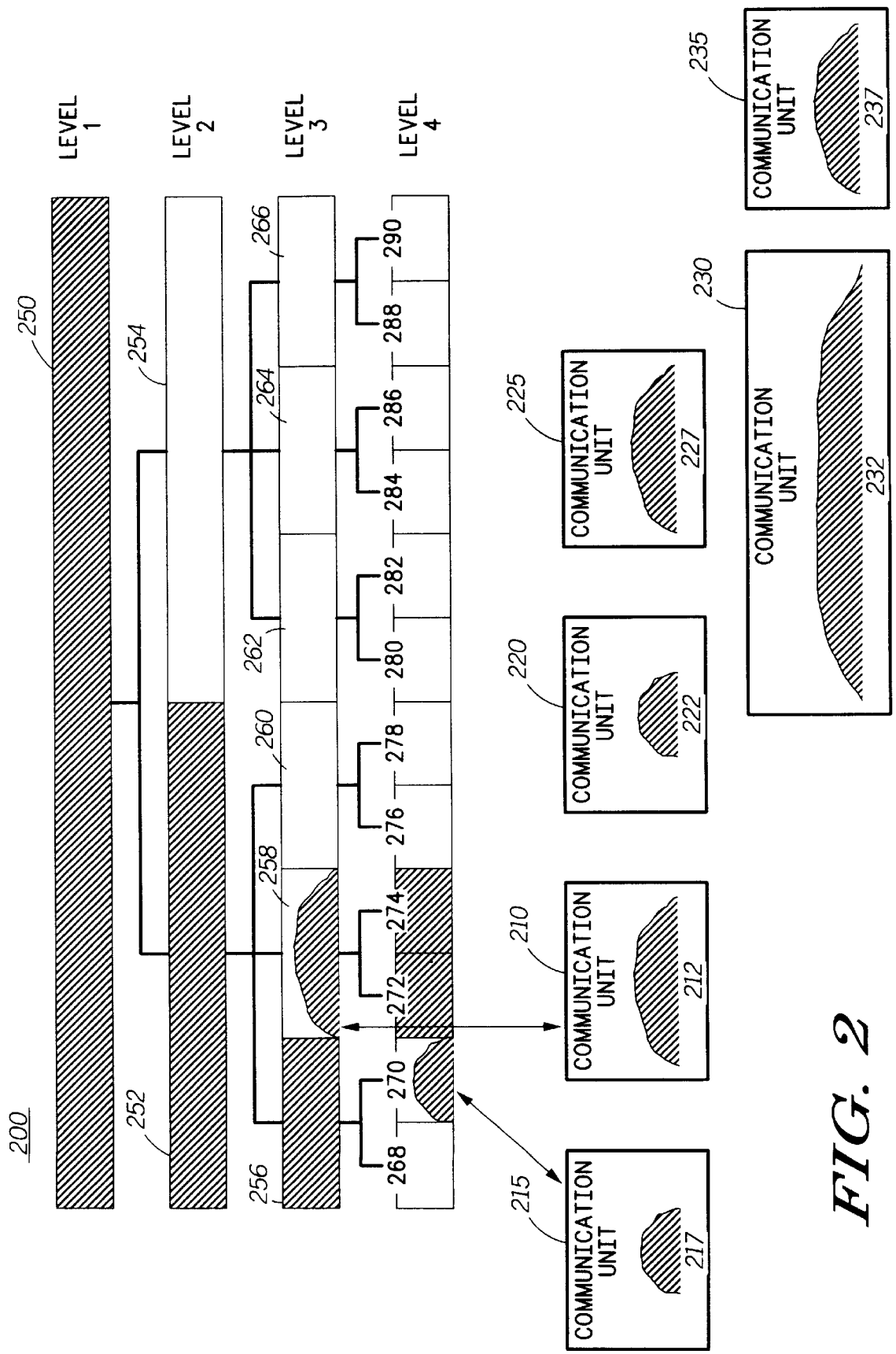
FIG. 2 is a diagrammatic representation of one embodiment of a system resource region divided into a hierarchical set of different size resource slots for a plurality of variable resource size communication units in accordance with the present invention.

The assignment process described above can be further explained using FIG. 2, numeral 200. This figure shows a hierarchical representation of a resource region (200) with four levels. Level 1 contains a single slot (250) whose size is equivalent to the total size of the resource region. Level 2 contains two slots (252, 254) each of whose width is half that of the total size of the resource region. Level 3 contains six slots (256, 258, 260, 262, 264, 266) each of whose width is one-sixth that of the total size of the resource region. Level 4 contains twelve slots (268, 270, 272, 274, 276, 278, 280, 282, 284, 286, 288, 290) each of whose width is one-twelfth that of the total size of the resource region. This figure also shows two communication units (210 and 215) currently accessing the system. The first communication unit (210) has a signal (212) whose size matches the size of the resource slots on Level 3 and currently occupies one resource slot (258) on that level. In general, since there is only one physical signal resource region, a communication unit signal occupying a resource slot on a given hierarchical level will block all resource slots directly above it and directly below it throughout the levels of the hierarchy. An occupied resource slot on a given hierarchical level will always block exactly one resource slot on each level above it throughout the hierarchy. Furthermore, the size of these blocked resource slots will always be greater than or equal to the size of the occupied resource slot. The same occupied resource slot will also block at least one resource slot on each level below it throughout the hierarchy. For each level below the level containing the occupied resource slot, the cumulative size of the blocked resource slots on that level will equal the size of the occupied resource slot. In this illustrative example, because communication unit signal (212) occupies resource slot (258), it blocks the resource slots on levels above it in the hierarchy (252 and 250) as well as the resource slots on levels below it in the hierarchy (272 and 274). Therefore no communication unit signals whose sizes are commensurate with the size of the resource slots on Level 2 can occupy resource slot (252).

Similarly, no communication unit signals whose sizes are commensurate with the size of the resource slots on Level 4 can occupy resource slots (272 and 274). Similarly, because the signal (217) originating from communication unit (215) occupies resource slot (270), it blocks resource slot (256), resource slot (252), and resource slot (250). The solid gray shading in FIG. 2, numeral 200, indicates blocked resource slots (250, 252, 256, 272, 274).

Communication unit signals (222, 227, 232, 237) represent signals of communication units (220, 225, 230, 235, respectively) which are attempting to access the communication system (200) in a sequential order. For this example, the order of attempted access is communication unit (220), communication unit (225), communication unit (230), and finally, communication unit (235). In examining the overall assignment process, first consider communication unit (220)'s attempt to access the system. The first step in the assignment process calls for the determination of the resource size requirement of communication unit (220) which is equivalent to the size of communication unit signal (222). After this step is accomplished, the second step in the assignment process calls for the determination of a hierarchical level containing suitably sized resource slots. In this example, Level 4 has resource slots whose size matches the size of communication unit signal (222). The third and final step in the assignment process calls for the actual assignment to an available resource slot on the appropriate hierarchical level. In a preferred embodiment, if there were no available resource slots on the appropriate hierarchical level, the communication unit would be blocked from accessing the system. In this illustrative example, however, there are nine available resource slots on Level 4 (268, 276, 278, 280, 282, 284, 286, 288, 290). In order to choose between them, the criterion of maximizing the total number of remaining available resource slots is used.

If communication unit (220) is assigned to resource slot (288 or 290) it will block resource slot (266), resource slot (254), and resource slot (250), leaving eleven remaining available resource slots (260, 262, 264, 268, 276, 278, 280, 282, 284, 286, and (290 or 288, respectively)). Similarly, if communication unit (220) is assigned to resource slot (284 or 286) or resource slot (280 or 282), it will block resource slots (264 or 262), resource slot (254), and resource slot (250), leaving eleven remaining available resource slots in either case. If communication unit (220) is assigned to resource slot (276 or 278) it will block resource slot (260), resource slot (252), and resource slot (250). However, several of these resource slots (250, 252) were blocked already. Only one additional resource slot (260) will be blocked, leaving twelve remaining available resource slots (254, 262, 264, 266, 268, (278 or 276, respectively), 280, 282, 284, 286, 288, 290). If communication unit (220) is assigned to resource slot (268) it will block resource slot (256), resource slot (252), and resource slot (250). However, all of these slots are already blocked, leaving thirteen remaining available resource slots (254, 260, 262, 264, 266, 276, 278, 280, 282, 284, 286, 288, 290). The present invention calls for assigning resource slots such that the total number of remaining available resource slots is maximized. Since blocked resource slots are not available resource slots and, as such, are excluded when counting the total number of available resource slots, communication unit (220) is assigned to resource slot (268). At this point, communication unit (220) would be able to have its signal (222) occupy resource slot (268).

Next consider communication unit (225). Per the first two steps of the assignment process, it will be assigned to a resource slot on Level 3. There are four available resource slots on this level (260, 262, 264, 266). Assigning communication unit (225) to resource slot (262, 264, or 266) will block resource slot (254) along with resource slots (280 and 282; or 284 and 286; or 288 and 290, respectively), leaving nine remaining available resource slots (260, 276, 278, and ((264, 266, 284, 286, 288, 290) or (262, 266, 280, 282, 288, 290) or (262, 264, 280, 282, 284, 288)), respectively). If communication unit (225) is assigned to resource slot (260), it will block resource slots (276, 278, 252, and 250). However, some of these slots are already blocked, leaving ten remaining available resource slots (280, 282, 284, 286, 288, 290, 262, 264, 266, and 254). In accordance with the maximization criterion of the present invention, communication unit (225) will be assigned to resource slot (260). At this point, communication unit (225) would be able to have its signal (227) occupy the assigned resource slot (260). Next consider communication unit (230). Within the hierarchical representation (200), Level 2 has resource slots which match the size of the signal (232) sent by communication unit (230). There is only one available resource slot (254) on this level and hence, communication unit (230) will be assigned to resource slot (254). Furthermore, the assignment communication unit (230) to resource slot (254) also blocks resource slots (262, 264, 266, 280, 282, 284, 286, 288, 290), leaving no remaining available resource slots. At this point, communication unit (230) would be able to have its signal (232) occupy the assigned resource slot (254). Finally, consider communication unit (235). Per the assignment strategy, it would be assigned to a resource slot on Level 3. Unfortunately there are no available resource slots. Therefore communication unit (235) is blocked from accessing the system.

Note that if communication unit (220) had been assigned to any of resource slots (280, 282, 284, 286, 288, 290) or if communication unit (225) had been assigned to any of resource slots (262, 264, 266), resource slot (254) would have been blocked. This blockage would have unnecessarily prevented communication unit (230) from accessing the system. In such a scenario, enough total resource space would have been available for communication unit signal (232), but the resource space would have been spread across several resource slots and communication unit (230) would not have been able to use it. This blockage would have been in contrast to the necessary blockage of communication unit (235), detailed above. In that scenario, there was not enough total resource space available for communication unit signal (237). This deficiency translated directly to a lack of available, appropriately sized, resource slots in accordance with the present invention. In essence, the primary benefit of the present invention is the prevention of unnecessary blocking of communication units in line with the scenario described above. As such, the present invention maximizes the overall capacity of a system which supports communication units with varying resource requirements.

The maximization of available resource slots criterion does not always yield a unique resource slot assignment. This situation can be understood by considering FIG. 2, numeral 200, before any of the communication units (220, 225, 230, and 235) trying to access the communication system are assigned. At this stage, there are fourteen remaining available resource slots. Assume now that communication unit (225) attempts to access the system. Per the assignment process detailed earlier, this communication unit will be assigned to resource slot (260), leaving eleven remaining available resource slots. If another communication unit (235), whose signal (237) has the same size as the signal (227) of communication unit (225), attempts to access the system it must be assigned to either one of resource slots (262, 264, or 266) per the assignment process. Each of these possible assignments will leave seven remaining available resource slots. An assignment to resource slot (262) will leave resource slots (268, 284, 286, 288, 290, 264, and 266) available. An assignment to resource slot (264) will leave resource slots (268, 280, 282, 288, 290, 262, and 266) available and an assignment to resource slot (266) will leave resource slots (268, 280, 282, 284, 286, 262, and 264) available.

In such cases, where multiple possibilities exist for maximizing the number of remaining available resource slots, a secondary ambiguity regarding the choice among available resource slots on the appropriate hierarchical level arises. The primary ambiguity was mentioned earlier and was solved by the maximization of remaining available resource slots criterion. In a preferred embodiment, this secondary assignment ambiguity is resolved by having the access control unit always choose, on the appropriate hierarchical level, the left-most resource slot which satisfies the maximization of remaining available resource slots criterion. In the aforementioned illustrative example, the new communication unit (235) is assigned to resource slot (262). In another preferred embodiment, this secondary assignment ambiguity is resolved by having the access control unit always choose, on the appropriate hierarchical level, the right-most resource slot which satisfies the maximization of remaining available resource slots criterion. In the accompanying illustrative example, the new communication unit (235) is assigned to resource slot (266). In yet another preferred embodiment, this secondary ambiguity is resolved by having the access control unit randomly choose, on the appropriate hierarchical level, one of the resource slots which satisfies the maximization of remaining available resource slots criterion. This random choice can be done in accordance with any random number generation scheme known in the art. In the illustrative example, the new communication unit (235) is assigned randomly to one of resource slots (262, 264, and 266).

As communication units vacate the hierarchical resource slots assigned to them, hereafter referred to as vacating the communication system, these slots become available for new users. Furthermore, resource slots throughout the hierarchy which were being blocked by these communication units potentially become available as well. The total number of resource slots in the hierarchy made available depends on which communication units vacate the system and, correspondingly, which resource slots they vacated. This concept can be better understood with the help of FIG. 2, numeral 200. Consider the hierarchical representation of the resource region as is, before communication units (220, 225, 230, and 235) access the system. Under this scenario, there are fourteen available resource slots. Now, assume that communication unit (225) attempts to access the system. In accordance with the present invention, communication unit (225) would be assigned to resource slot (260). This assignment also blocks resource slots (276 and 278), leaving eleven remaining available resource slots (268, 280, 282, 284, 286, 288, 290, 262, 264, 266, 254). Next, assume that communication unit (235) attempts to access the system. This attempt leads to the secondary ambiguity described earlier, as the signal (237) of this communication unit (235) can be placed in any one of resource slots (262, 264, 266) in accordance with the present invention. In this embodiment, assume that the secondary ambiguity is resolved by assigning communication unit (235) to resource slot (262). This assignment also blocks resource slots (254, 280, and 282), leaving seven remaining available resource slots.

If communication unit (225) vacates the communication system, resource slots (260, 276, and 278) would become available for assignment to other communication units. The total number of remaining available resource slots would now be ten. On the other hand, if communication unit (225) remains in the communication system and communication unit (235) vacates the communication system, resource slots (262, 254, 280, and 282) become available for assignment to other communication units. The total number of remaining available resource slots would be eleven instead of ten. Alternatively, the same end result of eleven remaining available resource slots can be obtained by having communication unit (225) vacate the communication system and free resource slots (260, 276, and 278) and having communication unit (235) reassigned from resource slot (262) to resource slot (260). Its signal (237) then occupies resource slot (260) instead of resource slot (262). The process of having communication units which are accessing the system potentially switch resource slots assignments after other communication units vacate the system is designed to maximize capacity and avoid unnecessarily blocking any future communication units from accessing the system.

In order to preserve the maximum number of remaining available resource slots and avoid unnecessarily blocking any future communication units from accessing the system, the present invention provides for a resource reorganization scheme. Conceptually, the scheme operates by first deassigning all communication units currently accessing the system from their present resource slots leaving an empty hierarchy, and then reassigning them, one at a time, to new resource slots in accordance with the assignment strategy detailed earlier. In a preferred embodiment, all communication units that are deassigned are subsequently reassigned. That is, no communication units which are accessing the communication system are dropped from the communication system as part of the resource reorganization scheme. In practice, the resource reorganization scheme is not a two step process, as the deassignment and reassignment are combined into a single step comprising potential movements among resource slots. The hierarchical resource reorganization scheme can be better understood with the help of FIG. 2, numeral 200. Consider the scenario described above, with communication unit (210) assigned to resource slot (258), communication unit (215) assigned to resource slot (270), communication unit (225) assigned to resource slot (260), and communication unit (235) assigned to resource slot (262). Now assume that communication unit (225) vacates the communication system, effectively freeing resource slots (260, 276, and 278). At this point, there are ten remaining available resource slots in the hierarchy.

Conceptually, the resource reorganization scheme would first temporarily deassign communication units (210, 215, and 235), emptying the entire hierarchy. It would then reassign them, one at a time, to available resource slots. Begin by considering communication unit (215). Per the assignment strategy it should be assigned to a resource slot on Level 4. Since the hierarchy is empty at this point, an assignment to any resource slot on this level would leave the same number of total remaining available resource slots—sixteen. This situation brings up the secondary ambiguity described earlier. Assume that this ambiguity is resolved by assigning communication unit (215) to resource slot (268). Next consider communication unit (210). According to the assignment strategy, it is assigned to a resource slot on Level 3. Both resource slots (258 and 260) would maximize the total number of remaining available resource slots at fourteen. Assume that this secondary ambiguity is resolved by assigning communication unit (210) to resource slot (258). Finally, consider communication unit (235). It also is assigned to a resource slot on Level 3. On this level, only resource slot (260) would maximize the total number of remaining available resource slots at eleven. At this point, after the resource reorganization, the total number of remaining available resource slots has effectively increased from ten to eleven, resulting in less potential for needless blockage. In practice, the resource reorganization example given above would not be a two step deassignment/reassignment process. Rather, it would have consisted of having communication unit (215) reassigned from resource slot (270) to resource slot (268), keeping communication unit (210) assigned to resource slot (258), and having communication unit (235) reassigned from resource slot (262) to resource slot (260).

In a preferred embodiment, the communication units still assigned to resource slots in the communication system undergo the resource reorganization process just after a communication unit vacates the communication system. This process is repeated each time a communication unit vacates the communication system. In another preferred embodiment, the communication units currently assigned to resource slots in the communication system undergo the resource reorganization process when a communication unit attempts to access the communication system. This process is repeated each time a communication unit attempts to access the system. In yet another preferred embodiment, the communication units still accessing the communication system undergo the resource reorganization scheme at periodic time intervals. In a final preferred embodiment, the communication units still assigned to resource slots in the communication system undergo the resource reorganization scheme each time a change is made in the hierarchical representation of the resource region. As mentioned earlier, such changes can consist of, but are not limited to, adding a hierarchical level or deleting a hierarchical level.

Figure 5:
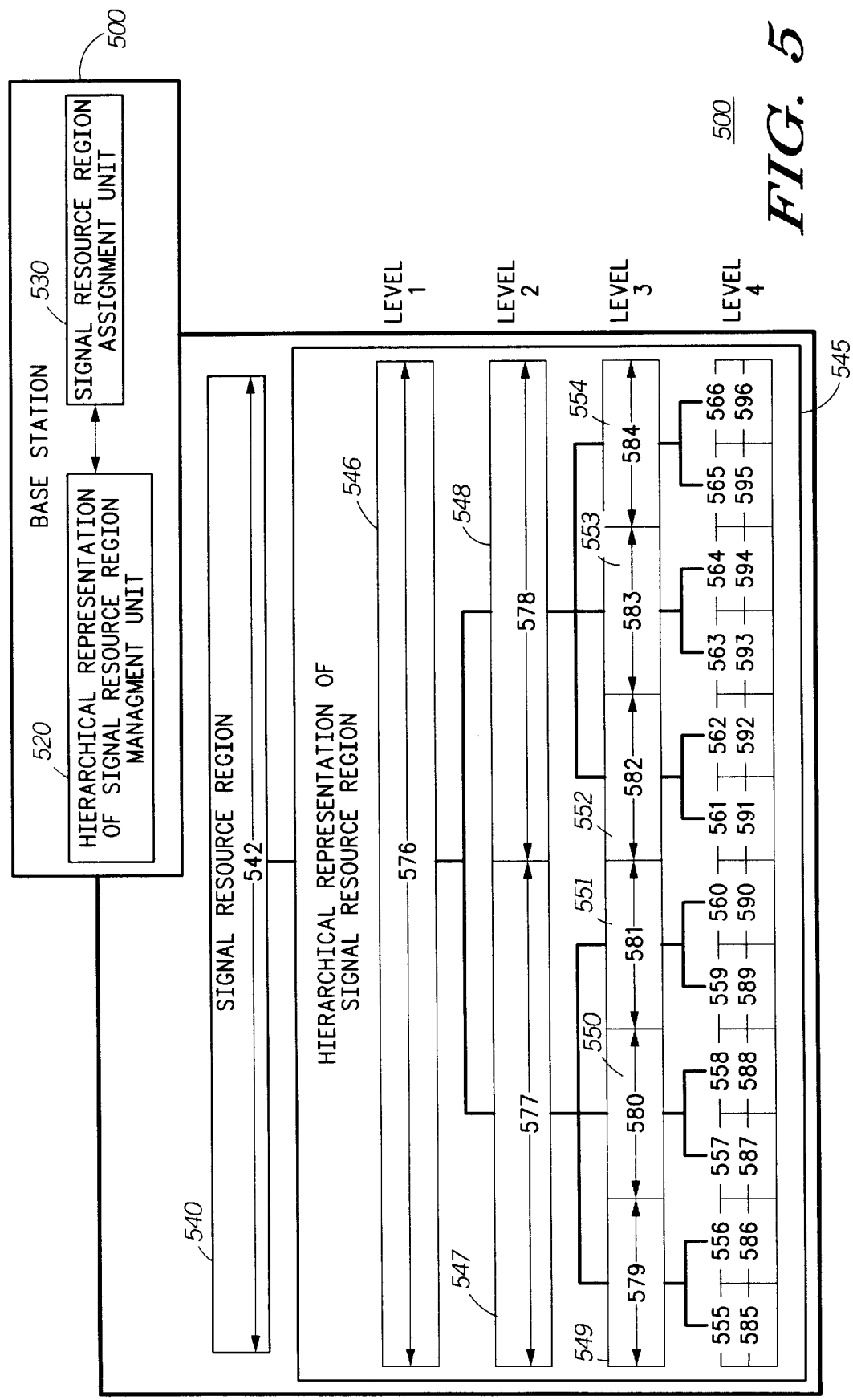
FIG. 5 is a diagrammatic representation of one embodiment of a base station in accordance with the present invention.

FIG. 5 illustrates a base station (500) in accordance with one embodiment of the present invention. The base station (500) is an access control unit. The base station (500) manages the hierarchical representation (545) of the shared resource region (540) using a hierarchical representation of signal resource region management unit (520) and assigns communication units to appropriately sized resource slots within the hierarchy using a signal resource region assignment unit (530). In a preferred embodiment, the signal resource region assignment unit (530) also implements the resource reorganization scheme detailed earlier. In the illustrative example, resource slots are illustrated for Level 1 (546), Level 2 (547, 548), Level 3 (549, 550, 551, 552, 553, 554) and Level 4 (555, 556, 557, 558, 559, 560, 561, 562, 563, 564, 565, 566), with corresponding sizes for Level 1 (576), Level 2 (577, 578), Level 3 (579, 580, 581, 582, 583, 584) and Level 4 (585, 586, 587, 588, 589, 590, 591, 592, 593, 594, 595, 596), respectively. In addition, the signal resource region (540) itself is illustrated along with its corresponding size (542).

Figure 8:
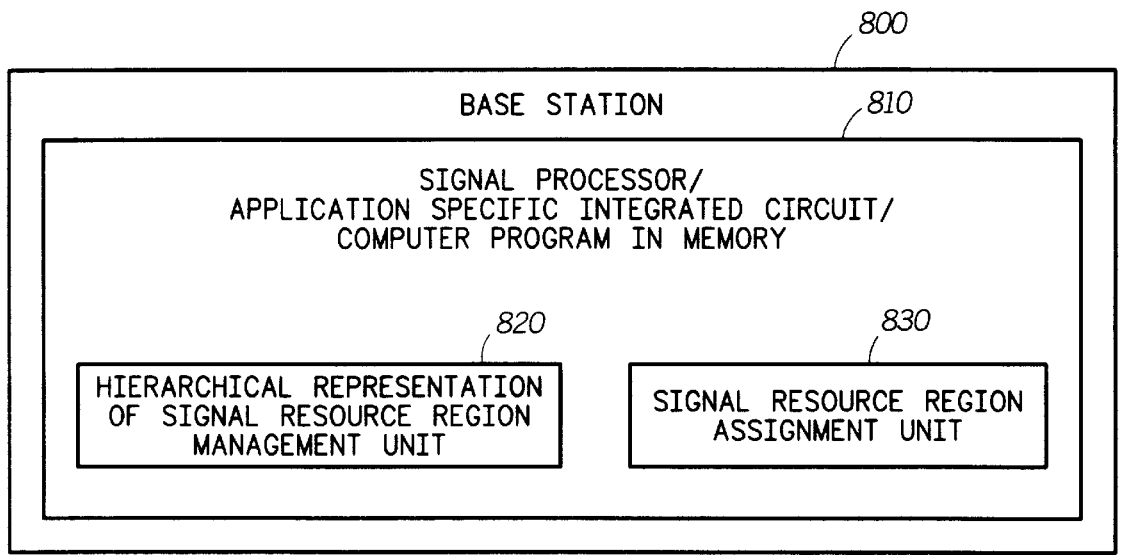
FIG. 8 is a diagrammatic representation of one embodiment of a base station having a signal processor/application specific integrated circuit/computer program in memory in accordance with the present invention.

FIG. 8 illustrates a base station (800) in accordance with one embodiment of the present invention. The base station (800) is an access control unit and contains a signal processor/application specific integrated circuit/computer program in memory (810). Furthermore, the signal processor/application specific integrated circuit/computer program in memory (810) contains a hierarchical representation of signal resource region management unit (820), which manages the hierarchical representation of the shared resource region, and a signal resource region assignment unit (830), which assigns communication units to appropriately sized resource slots and implements the resource reorganization scheme in accordance with the present invention.

Figure 6:
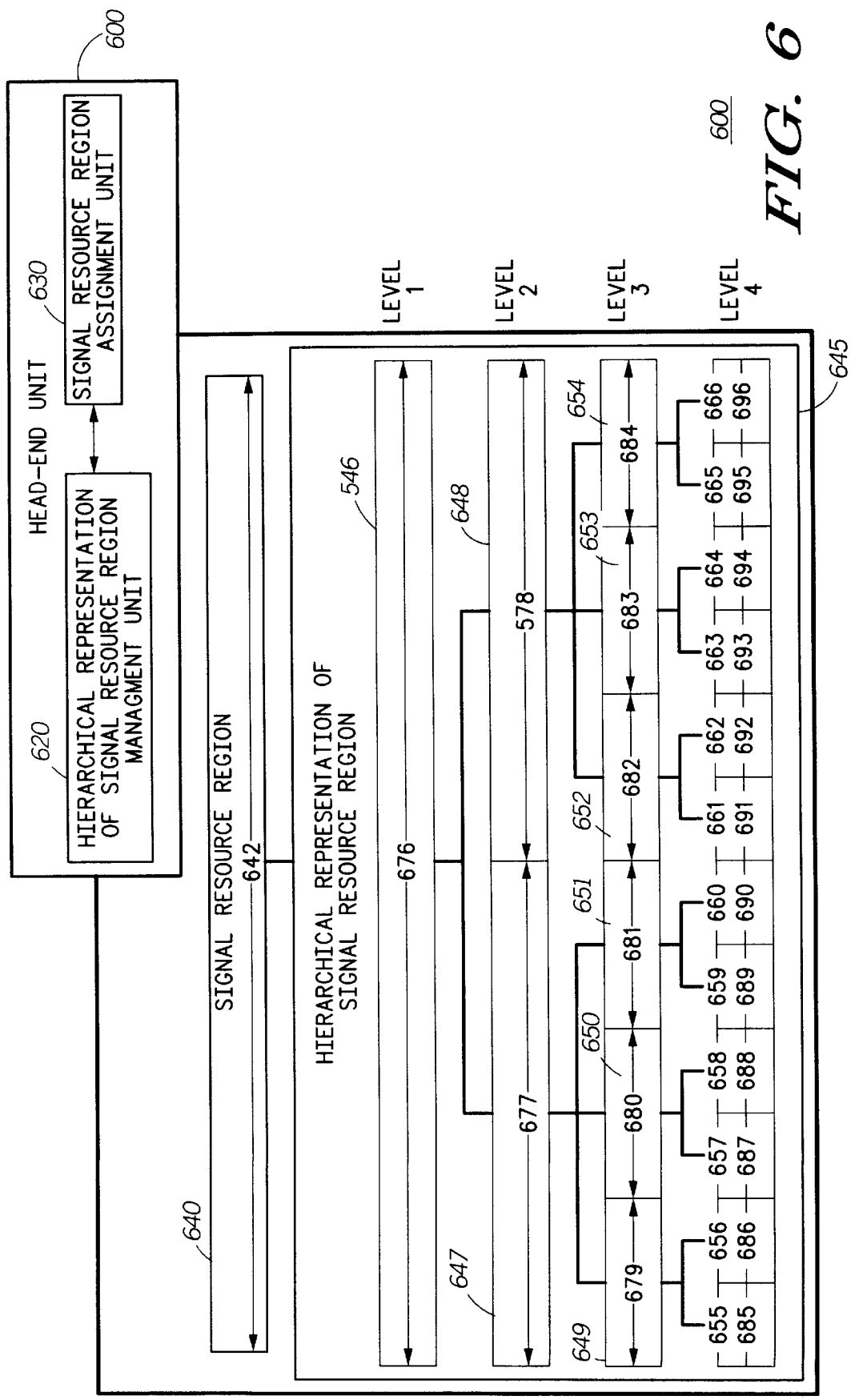
FIG. 6 is a diagrammatic representation of one embodiment of a head-end unit in accordance with the present invention.

FIG. 6 illustrates a head-end unit (600) in accordance with one embodiment of the present invention. The head-end unit (600) is an access control unit. The head-end unit (600) manages the hierarchical representation (645) of the shared resource region (640) using a hierarchical representation of signal resource region management unit (620) and assigns communication units to appropriately sized resource slots within the hierarchy using a signal resource region assignment unit (630). In a preferred embodiment, the signal resource region assignment unit (630) also implements the resource reorganization scheme detailed earlier. In the illustrative example, resource slots are illustrated for Level 1 (646), Level 2 (647, 648), Level 3 (649, 650, 651, 652, 653, 654) and Level 4 (655, 656, 657, 658, 659, 660, 661, 662, 663, 664, 665, 666), with corresponding sizes for Level 1 (676), Level 2 (677, 678), Level 3 (679, 680, 681, 682, 683, 684) and Level 4 (685, 686, 687, 688, 689, 690, 691, 692, 693, 694, 695, 696), respectively. In addition, the signal resource region (640) itself is illustrated along with its corresponding size (642).

Figure 9:
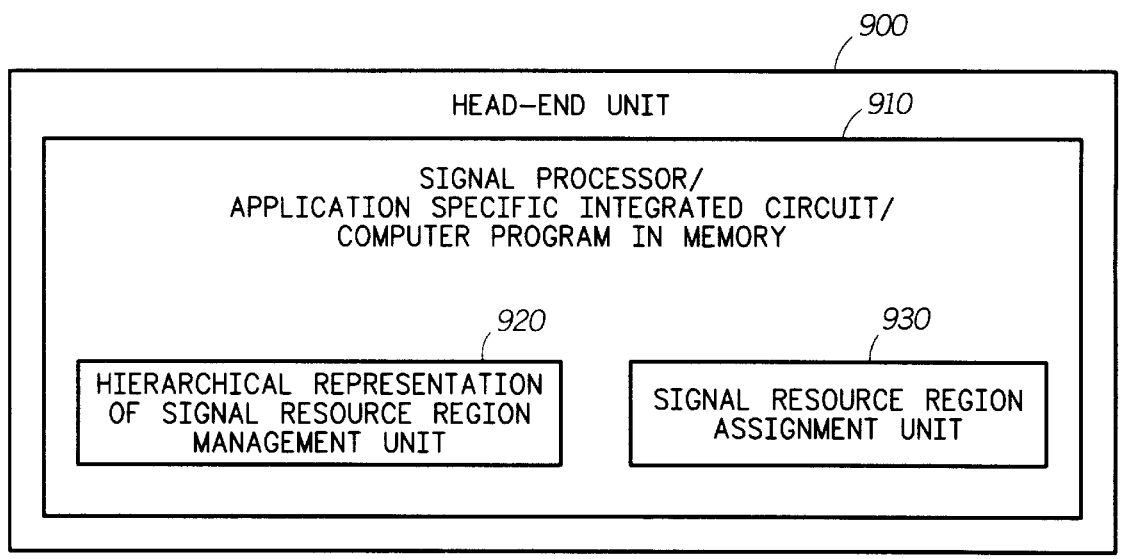
FIG. 9 is a diagrammatic representation of one embodiment of a head-end unit having a signal processor/application specific integrated circuit/computer program in memory in accordance with the present invention.

FIG. 9 illustrates a head-end unit (900) in accordance with one embodiment of the present invention. The head-end unit (900) is an access control unit and contains a signal processor/application specific integrated circuit/computer program in memory (910). Furthermore, the signal processor/application specific integrated circuit/computer program in memory (910) contains a hierarchical representation of signal resource region management unit (920), which manages the hierarchical representation of the shared resource region, and a signal resource region assignment unit (930), which assigns communication units to appropriately sized resource slots and implements the resource reorganization scheme in accordance with the present invention.

Figure 7:
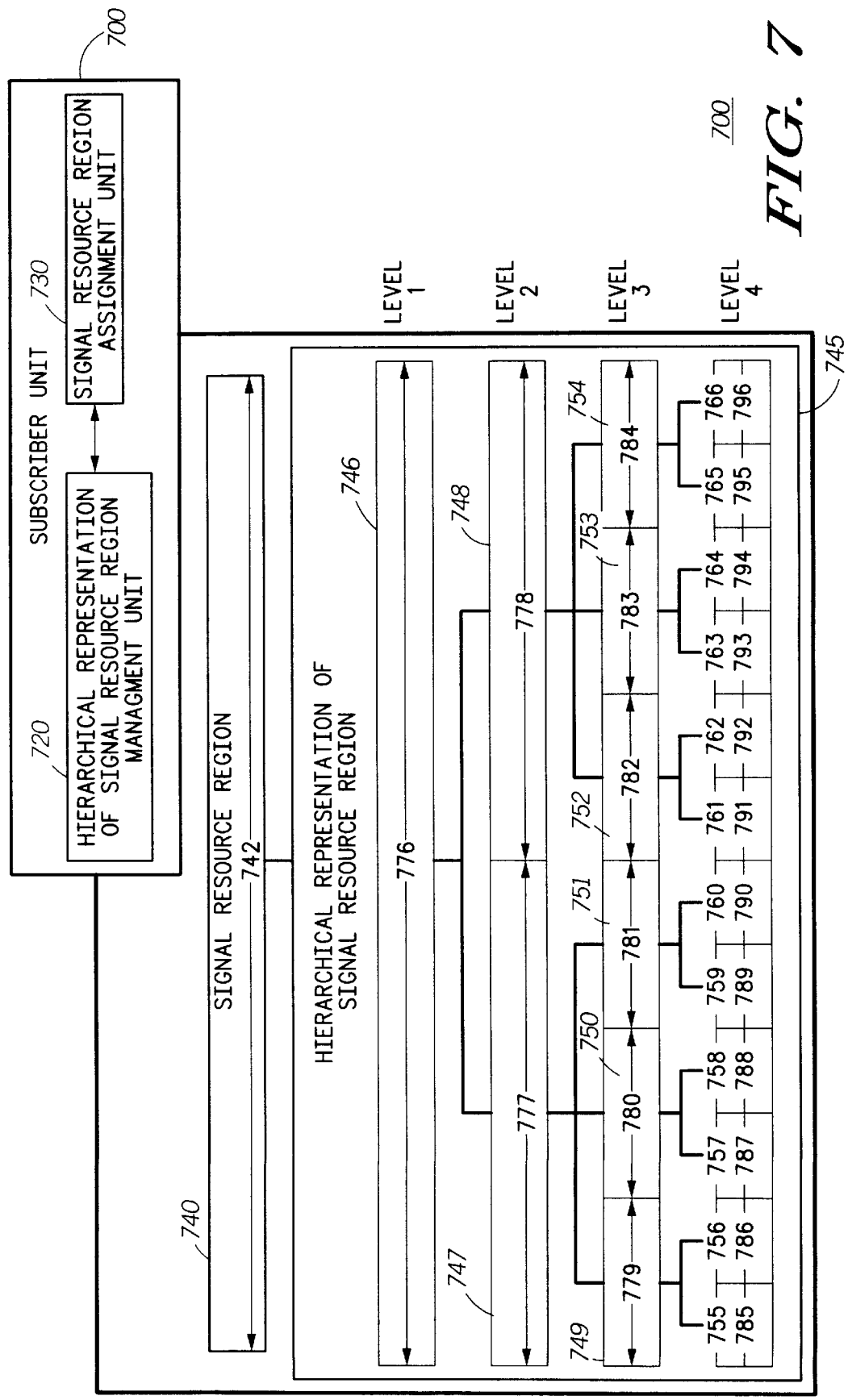
FIG. 7 is a diagrammatic representation of one embodiment of a subscriber unit in accordance with the present invention.

FIG. 7 illustrates a subscriber unit (700) in accordance with one embodiment of the present invention. The subscriber unit (700) is an access control unit. The subscriber unit (700) manages the hierarchical representation (745) of the shared resource region (740) using a hierarchical representation of signal resource region management unit (720) and assigns communication units to appropriately sized resource slots within the hierarchy using a signal resource region assignment unit (730). In a preferred embodiment, the signal resource region assignment unit (730) also implements the resource reorganization scheme detailed earlier. In the illustrative example, resource slots are illustrated for Level 1 (746), Level 2 (747, 748), Level 3 (749, 750, 751, 752, 753, 754) and Level 4 (755, 756, 757, 758, 759, 760, 761, 762, 763, 764, 765, 766), with corresponding sizes for Level 1 (776), Level 2 (777, 778), Level 3 (779, 780, 781, 782, 783, 784) and Level 4 (785, 786, 787, 788, 789, 790, 791, 792, 793, 794, 795, 796), respectively. In addition, the signal resource region (740) itself is illustrated along with its corresponding size (742).

Figure 10:
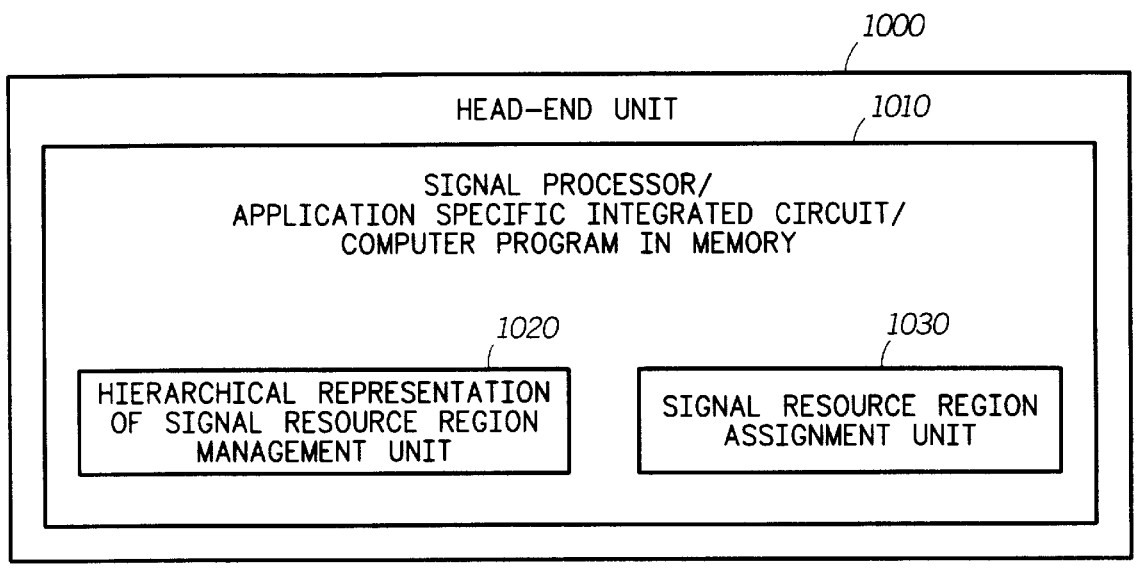
FIG. 10 is a diagrammatic representation of one embodiment of a subscriber unit having a digital signal processor/application specific integrated circuit/computer program in memory in accordance with the present invention.

FIG. 10 illustrates a subscriber unit (1000) in accordance with one embodiment of the present invention. The subscriber unit (1000) is an access control unit and contains a signal processor/application specific integrated circuit/computer program in memory (1010). Furthermore, the signal processor/application specific integrated circuit/computer program in memory (1010) contains a hierarchical representation of signal resource region management unit (1020), which manages the hierarchical representation of the shared resource region, and a signal resource region assignment unit (1030), which assigns communication units to appropriately sized resource slots and implements the resource reorganization scheme in accordance with the present invention.

Figure 3:
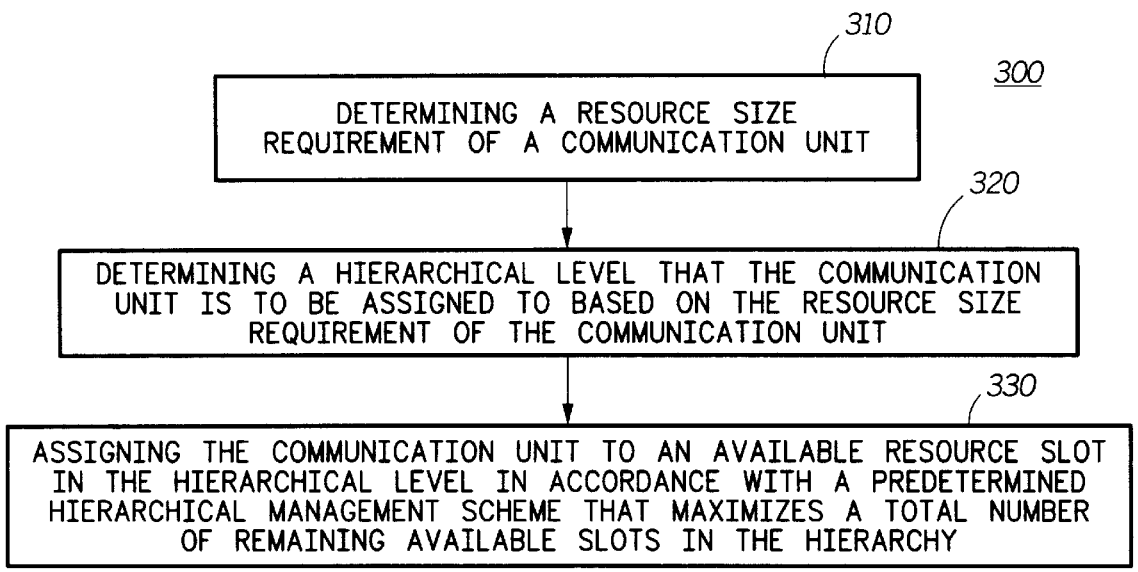
FIG. 3 is a flowchart of steps of a method in accordance with one embodiment of the present invention.

FIG. 3, numeral 300, illustrates a flow diagram of steps executed to enable resource management in a communication system or group of communication systems supporting a plurality of communication units with varying resource size requirements in accordance with a preferred embodiment of the present invention. When a communication unit requests assignment to the signal resource region, either for transmission and/or reception purposes, the access control unit first determines (310) the resource size requirements of the communication unit and then, based on these requirements, determines (320) the appropriate hierarchical level within the hierarchical representation of the resource region to which the communication unit will be assigned. Finally, the access control unit assigns (330) the communication unit to an available resource slot on the chosen hierarchical level in accordance with a predetermined hierarchical management scheme that maximizes the total number of remaining available resource slots in the hierarchy. In the event that more than one resource slot maximizes this criterion, the access control unit chooses a single resource slot among the plurality.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for providing efficient resource management for one of a communication system and a group of communication systems, supporting a plurality of communication units, wherein the communication units in the communication system/systems have resource size requirements that may differ, wherein the number of resource size requirements is greater than two, the method comprising the steps of:

A) determining resource size requirements of the communication units;
   B) determining a hierarchical level that the communication units are to be assigned to based on resource size requirements of the communication units; and
   C) assigning the communication units to available resource slots in the hierarchical level in accordance with a predetermined hierarchical management scheme that maximizes a total number of remaining available slots in a hierarchy.

2. The method of claim 1 wherein the hierarchical level is one level of a plurality of levels of a hierarchical representation of a resource region.

3. The method of claim 2 wherein the hierarchical level is selected to ensure that a size of the resource slot on a selected level is both:
   A) greater than or equal to the resource size requirement of the communication unit, and
   B) less than twice the resource size requirement of the communication unit.

4. The method of claim 2 wherein the hierarchical level is selected to ensure that:
   A) a size of the resource slot on a selected level is greater than or equal to a resource size requirement of the communication unit, and
   B) a size of a resource slot on a next hierarchical level is less than the resource size requirement of the communication unit.

5. The method of claim 1 wherein the resource slot is based on one of:
   A) frequency;
   B) time; and
   C) code.

6. The method of claim 1 wherein the resource slot is based on a combination of time and frequency.

7. The method of claim 2 wherein the plurality of levels of the hierarchical representation of the resource region are derived from a recursive division of the resource region from a first level having one or more largest defined resource slots to an nth level, n a predetermined integer, have a plurality of smallest defined size resource slots.

8. The method of claim 2 wherein a size of a smallest defined size resource slots is greater than or equal to a smallest signal size utilized by the plurality of communication units.

9. The method of claim 2 wherein a size of a largest defined size resource slots is greater than or equal to a largest signal size utilized by the plurality of communication units.

10. The method of claim 2 wherein a number of resource slots in a level is a multiple of a number of resource slots in a previous level.

11. The method of claim 1 wherein the predetermined hierarchical management scheme assigns the communication unit to a single resource slot among a potential plurality of resource slots that maximize the total number of remaining available slots in the hierarchy.

12. The method of claim 11 where a single resource slot selected is a left-most resource slot among the potential plurality of resource slots.

13. The method of claim 11 where a single resource slot selected is a right-most resource slot among the potential plurality of resource slots.

14. The method of claim 11 where a single resource slot is selected randomly from the potential plurality of resource slots.

15. The method of claim 1 wherein the method is implemented by at least one of:
   A) a processor;
   B) an application specific integrated circuit; and
   C) a memory having a stored computer program.

16. A system for providing an efficient resource management scheme for one of: a communication system and a group of communication systems, supporting a plurality of communication units, where each of the communication units have resource size requirements that may differ, wherein the number of resource size requirements is greater than two comprising:

A) an access control unit, arranged to receive and transmit signals from/to communication units, for determining resource size requirements and hierarchical level for communication units and for assigning said communication units to resource slots on said hierarchical level in accordance with a predetermined hierarchical resource management scheme; and
   B) a plurality of communication units each having a resource size requirement, arranged to transmit and receive signals to/from one of: the access control unit and another communication unit, for assignment to a hierarchical resource slot in accordance with a predetermined hierarchical resource management scheme.

17. The system of claim 16 wherein the hierarchical level is one level of a plurality of levels of a hierarchical representation of a resource region.

18. The system of claim 17 wherein the hierarchical level is selected to ensure that a size of the resource slot on a selected level is both:
   A) greater than or equal to the resource size requirement of the communication unit, and
   B) less than twice the resource size requirement of the communication unit.

19. The system of claim 17 wherein the hierarchical level is selected to ensure that:
   A) a size of the resource slot on a selected level is greater than or equal to the resource size requirement of the communication unit, and
   B) a size of a resource slot on a next hierarchical level is less than the resource size requirement of the communication unit.

20. The system of claim 16 wherein the resource slot is based on one of:
   A) frequency;
   B) time; and
   C) code.

21. The system of claim 16 wherein the resource slot is based on a combination of time and frequency.

22. The system of claim 17 wherein the plurality of levels of the hierarchical representation of the resource region are derived from a recursive division of the resource region from a first level having one or more largest defined resource slots to an nth level have a plurality of smallest defined size resource slots.

23. The system of claim 17 wherein a size of a smallest defined size resource slots is greater than or equal to a smallest signal size utilized by the plurality of communication units.

24. The system of claim 17 wherein a size of a largest defined size resource slots is greater than or equal to a largest signal size utilized by the plurality of communication units.

25. The system of claim 17 wherein a number of resource slots in a level is a multiple of a number of resource slots in a previous level.

26. The system of claim 16 wherein the predetermined hierarchical management scheme assigns the communication unit to a single resource slot among a potential plurality of resource slots that maximize the total number of remaining available slots in the hierarchy.

27. The system of claim 26 where a single resource slot selected is a left-most resource slot among the potential plurality of resource slots.

28. The system of claim 26 where a single resource slot selected is a right-most resource slot among the potential plurality of resource slots.

29. The system of claim 26 where a single resource slot is selected randomly from the potential plurality of resource slots.

30. The system of claim 16 wherein the efficient resource management method is implemented by at least one of:
   A) a processor;
   B) an application specific integrated circuit; and
   C) a memory having a stored computer program.

31. A base station/head-end unit/subscriber unit having an access control unit arranged to receive and transmit signals from/to communication units, for providing an efficient resource management scheme for one of: a communication system and a group of communication systems, supporting a plurality of communication units, where the communication units have resource size requirements that may differ, wherein the number of resource size requirements is greater than two, the access control unit comprising:
   A) a hierarchical representation of signal resource region management unit, for determining resource size requirements and corresponding hierarchical level for communication units; and
   B) a signal resource region assignment unit, coupled to the hierarchical representation of signal resource region management unit, for assigning said communication units to resource slots on said hierarchical level in accordance with a predetermined hierarchical resource management scheme.

32. The base station/head-end unit/subscriber unit of claim 31 wherein the hierarchical level is one level of a plurality of levels of a hierarchical representation of a resource region.

33. The base station/head-end unit/subscriber unit of claim 32 wherein the hierarchical level is selected to ensure that the size of the resource slot on the selected level is both:
   A) greater than or equal to the resource size requirement of the communication unit, and
   B) less than twice the resource size requirement of the communication unit.

34. The base station/head-end unit/subscriber unit of claim 32 wherein the hierarchical level is selected to ensure that:
   A) a size of the resource slot on a selected level is greater than or equal to the resource size requirement of the communication unit, and
   B) a size of a resource slot on a next hierarchical level is less than the resource size requirement of the communication unit.

35. The base station/head-end unit/subscriber unit of claim 31 wherein the resource slot is based on one of:
   A) frequency;
   B) time; and
   C) code.

36. The base station/head-end unit/subscriber unit of claim 31 wherein the resource slot is based on a combination of time and frequency.

37. The base station/head-end unit/subscriber unit of claim 32 wherein the plurality of levels of the hierarchical representation of the resource region are derived from a recursive division of the resource region from a first level having one or more largest defined resource slots to an nth level have a plurality of smallest defined size resource slots.

38. The base station/head-end unit/subscriber unit of claim 32 wherein a size of a smallest defined size resource slots is greater than or equal to a smallest signal size utilized by the plurality of communication units.

39. The base station/head-end unit/subscriber unit of claim 32 wherein a size of a largest defined size resource slots is greater than or equal to a largest signal size utilized by the plurality of communication units.

40. The base station/head-end unit/subscriber unit of claim 32 wherein a number of resource slots in a level is a multiple of a number of resource slots in a previous level.

41. The base station/head-end unit/subscriber unit of claim 32 wherein the predetermined hierarchical management scheme assigns the communication unit to a single resource slot among a potential plurality of resource slots that maximize the total number of remaining available slots in the hierarchy.

42. The base station/head-end unit/subscriber unit of claim 41 where a single resource slot selected is a left-most resource slot among the potential plurality of resource slots.

43. The base station/head-end unit/subscriber unit of claim 41 where a single resource slot selected is a right-most resource slot among the potential plurality of resource slots.

44. The base station/head-end unit/subscriber unit of claim 41 where a single resource slot is selected randomly from the potential plurality of resource slots.

45. The base station/head-end unit/subscriber unit of claim 32 wherein the efficient resource management method is implemented by at least one of:
   A) a processor;
   B) an application specific integrated circuit; and
   C) a memory having a stored computer program.

46. A method for providing efficient resource management for one of a communication system and a group of communication systems, supporting a plurality of communication units, wherein the communication units in the communication system/systems have resource size requirements that may differ, comprising the steps of:
   A) determining a resource size requirement of a communication unit;
   B) determining a hierarchical level that the communication unit is to be assigned to based on a resource size requirement of the communication unit; and
   C) assigning the communication unit to an available resource slot in the hierarchical level in accordance with a predetermined hierarchical management scheme that maximizes a total number of remaining available slots in a hierarchy, wherein the hierarchical level is one level of a plurality of levels of a hierarchical representation of a resource region, wherein the plurality of levels of the hierarchical representation of the resource region are derived from a recursive division of the resource region from a first level having one or more largest defined resource slots to an nth level, n a predetermined integer, have a plurality of smallest defined size resource slots, wherein the plurality of levels of the hierarchical representation of the resource region is one of: modified, and replaced in accordance with a predetermined modification-replacement scheme.

47. The method of claim 46 wherein an additional level is added to the plurality of levels of the hierarchical representation of the resource region.

48. The method of claim 46 wherein a level is removed from the plurality of levels of the hierarchical representation of the resource region.

49. A method for providing efficient resource management for one of a communication system and a group of communication systems, supporting a plurality of communication units, wherein the communication units in the communication system/systems have resource size requirements that may differ, comprising the steps of:
   A) determining a resource size requirement of a communication unit;
   B) determining a hierarchical level that the communication unit is to be assigned to based on a resource size requirement of the communication unit; and
   C) assigning the communication unit to an available resource slot in the hierarchical level in accordance with a predetermined hierarchical management scheme that maximizes a total number of remaining available slots in a hierarchy; and
   D) reassigning slots in the hierarchy to ensure that a total number of remaining available slots in the hierarchy is maximized based on a resource reorganization scheme.

50. The method of claim 49 wherein a reassignment is performed when a communication unit accesses the communication system.

51. The method of claim 49 wherein a reassignment is performed when a communication unit vacates the hierarchical resource slot assigned to the communication unit.

52. The method of claim 49 wherein a reassignment is performed when the hierarchical resource slot assigned to the communication unit is made unavailable to the communication unit.

53. The method of claim 49 wherein a reassignment is performed at predetermined time intervals.

54. The method of claim 49 wherein a reassignment is performed when the hierarchical representation of the resource region is one of: modified, and replaced.

55. A system for providing an efficient resource management scheme for one of: a communication system and a group of communication systems, supporting a plurality of communication units, where each of the communication units have resource size requirements that may differ, comprising:
   A) an access control unit, arranged to receive and transmit signals from/to communication units, for determining a resource size requirement and hierarchical level for a communication unit and for assigning said communication unit to a resource slot on said hierarchical level in accordance with a predetermined hierarchical resource management scheme; and
   B) a plurality of communication units each having a resource size requirement, arranged to transmit and receive signals to/from one of: the access control unit and another communication unit, for assignment to a hierarchical resource slot in accordance with a predetermined hierarchical resource management scheme, wherein the hierarchical level is one level of a plurality of levels of a hierarchical representation of a resource region, wherein the plurality of levels of the hierarchical representation of the resource region are derived from a recursive division of the resource region from a first level having one or more largest defined resource slots to an nth level have a plurality of smallest defined size resource slots, wherein the plurality of levels of the hierarchical representation of the resource region is one of: modified, and replaced in accordance with a predetermined modification-replacement scheme.

56. The system of claim 55 wherein an additional level is added to the plurality of levels of the hierarchical representation of the resource region.

57. The system of claim 55 wherein a level is removed from the plurality of levels of the hierarchical representation of the resource region.

58. A system for providing an efficient resource management scheme for one of: a communication system and a group of communication systems, supporting a plurality of communication units, where each of the communication units have resource size requirements that may differ, comprising:
   A) an access control unit, arranged to receive and transmit signals from/to communication units, for determining a resource size requirement and hierarchical level for a communication unit and for assigning said communication unit to a resource slot on said hierarchical level in accordance with a predetermined hierarchical resource management scheme; and
   B) a plurality of communication units each having a resource size requirement, arranged to transmit and receive signals to/from one of: the access control unit and another communication unit, for assignment to a hierarchical resource slot in accordance with a predetermined hierarchical resource management scheme, wherein the predetermined hierarchical resource management scheme includes a resource reorganization scheme, wherein communication units using the one of a communication system and a group of communication systems are reassigned slots in the hierarchy to ensure that the total number of remaining available slots in the hierarchy is maximized.

59. The system of claim 58 wherein a reassignment is performed when a communication unit accesses the communication system.

60. The system of claim 58 wherein a reassignment is performed when a communication unit vacates the hierarchical resource slot assigned to the communication unit.

61. The system of claim 58 wherein a reassignment is performed when the hierarchical resource slot assigned to the communication unit is made unavailable to the communication unit.

62. The system of claim 58 wherein a reassignment is performed at predetermined time intervals.

63. The system of claims 58 wherein a reassignment is performed when the hierarchical representation of the resource region is one of: modified, and replaced.

64. A base station/head-end unit/subscriber unit having an access control unit arranged to receive and transmit signals from/to communication units, for providing an efficient resource management scheme for one of: a communication system and a group of communication systems, supporting a plurality of communication units, where the communication units have resource size requirements that may differ, the access control unit comprising:

A) a hierarchical representation of signal resource region management unit, for determining a resource size requirement and corresponding hierarchical level for a communication unit; and B) a signal resource region assignment unit, coupled to the hierarchical representation of signal resource region management unit, for assigning said communication unit to a resource slot on said hierarchical level in accordance with a predetermined hierarchical resource management scheme, wherein the hierarchical level is one level of a plurality of levels of a hierarchical representation of a resource region, wherein the plurality of levels of the hierarchical representation of the resource region are derived from a recursive division of the resource region from a first level having one or more largest defined resource slots to an nth level have a plurality of smallest defined size resource slots, wherein the plurality of levels of the hierarchical representation of the resource region is one of: modified, and replaced in accordance with a predetermined modification-replacement scheme.

65. The base station/head-end unit/subscriber unit of claim 64 wherein an additional level is added to the plurality of levels of the hierarchical representation of the resource region.

66. The base station/head-end unit/subscriber unit of claim 64 wherein a level is removed from the plurality of levels of the hierarchical representation of the resource region.

67. A base station/head-end unit/subscriber unit having an access control unit arranged to receive and transmit signals from/to communication units, for providing an efficient resource management scheme for one of: a communication system and a group of communication systems, supporting a plurality of communication units, where the communication units have resource size requirements that may differ, the access control unit comprising:

A) a hierarchical representation of signal resource region management unit, for determining a resource size requirement and corresponding hierarchical level for a communication unit; and B) a signal resource region assignment unit, coupled to the hierarchical representation of signal resource region management unit, for assigning said communication unit to a resource slot on said hierarchical level in accordance with a predetermined hierarchical resource management scheme, wherein the predetermined hierarchical resource management scheme includes a resource reorganization scheme, wherein communication units using the one of a communication system and a group of communication systems are reassigned slots in the hierarchy to ensure that a total number of remaining available slots in the hierarchy is maximized.

68. The base station/head-end unit/subscriber unit of claim 67 wherein a reassignment is performed when a communication unit accesses the communication system.

69. The base station/head-end unit/subscriber unit of claim 67 wherein a reassignment is performed when a communication unit vacates the hierarchical resource slot assigned to the communication unit.

70. The base station/head-end unit/subscriber unit of claim 67 wherein a reassignment is performed when the hierarchical resource slot assigned to the communication unit is made unavailable to the communication unit.

71. The base station/head-end unit/subscriber unit of claim 67 wherein a reassignment is performed at predetermined time intervals.

72. The base station/head-end unit/subscriber unit of claims 67 wherein a reassignment is performed when the hierarchical representation of the resource region is one of: modified, and replaced.

* * * * *

UNITED STATES PATENT AND TRADEMARK OFFICE
CERTIFICATE OF CORRECTION

PATENT NO. : 6,011,800
DATED : January 4, 2000
INVENTOR(S) : Nadgauda et al.

It is certified that error appears in the above-identified patent and that said Letters Patent is hereby corrected as shown below:

Column 18, line 27 reads "claim 32" should be --claim 31 --.

Column 18, line 42 reads "claim 32" should be --claim 31 --.

Signed and Sealed this

Seventeenth Day of October, 2000

Attest:

Q. TODD DICKINSON

*Attesting Officer*         *Director of Patents and Trademarks*